Oct. 9, 1956

C. B. GREER ET AL 2,765,654

FORCE INDICATING APPARATUS

Filed March 21, 1955

Arland B. Coleman
Cecil B. Greer
INVENTORS

BY
Charles E. Lightfoot
ATTORNEY

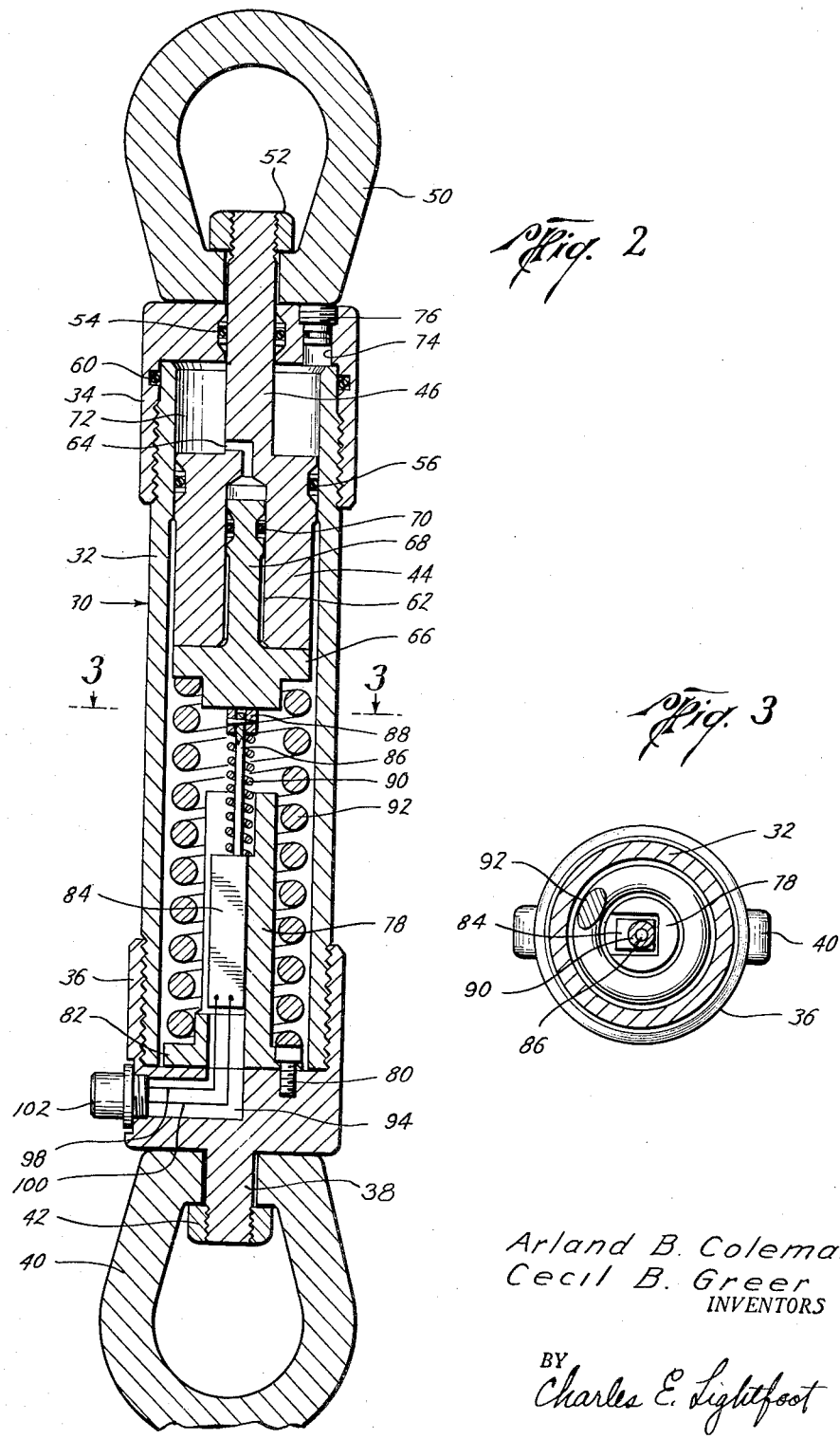

Oct. 9, 1956
C. B. GREER ET AL
2,765,654
FORCE INDICATING APPARATUS
Filed March 21, 1955
3 Sheets-Sheet 3
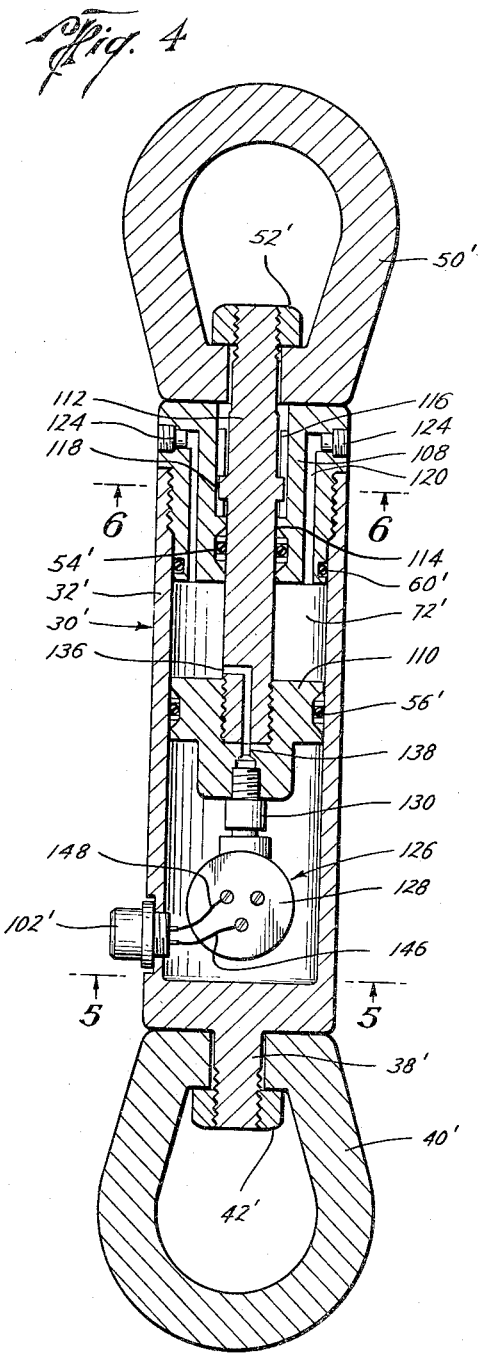
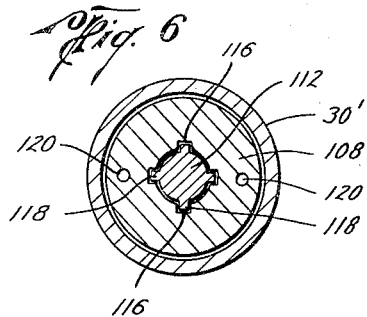
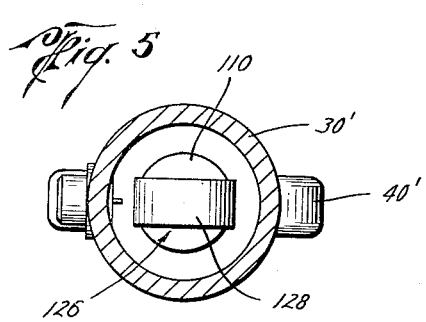
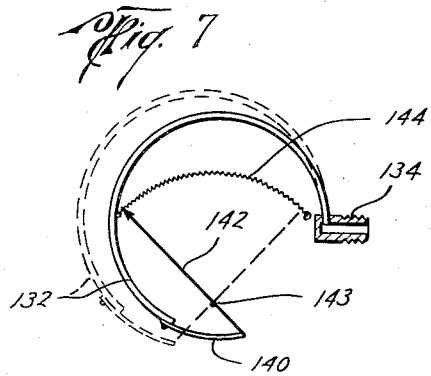
Arland B. Coleman
Cecil B. Greer
INVENTORS
BY Charles E. Lightfoot
ATTORNEY United States Patent Office 2,765,654
Patented Oct. 9, 1956

2,765,654

FORCE INDICATING APPARATUS

Cecil B. Greer and Arland B. Coleman, Houston, Tex.

Application March 21, 1955, Serial No. 495,468

4 Claims. (Cl. 73—141)

This invention relates to force indicating apparatus, and more particularly to means for indicating the weight of a string of tubing or other well equipment suspended in a well bore, or the pulling force which is exerted thereon.

In the carrying out of well drilling operations, and especially in conducting fishing operations to recover lost objects, such as a broken string of tubing in a well, breaking or other damage resulting in failure of the equipment sometimes occurs because of the exertion of a pulling force greater than that for which the equipment was designed. Such failure is particularly likely to occur in connection with operations in which line suspended equipment is employed, or in which special types of equipment is used which may be damaged or broken by the exertion of an excessive pulling force.

Jarring equipment is frequently employed in connection with such fishing operations which may be of the type having parts arranged for engagement to produce a sudden impact upon the exertion of an upward pull on the equipment and it is often desirable to limit such upward pulling force to a predetermined maximum in order to limit the force of the impact at a value below that which would result in damage to the equipment.

By the use of the invention the pulling force exerted in carrying out a jarring operation may be accurately determined, so that the pull exerted may be regulated in a manner to limit the force of the impact on the equipment, whereby damage to the equipment resulting from the exertion of too great an impact may be prevented.

The present invention has for an important object the provision of force measuring apparatus by which forces of widely varying magnitude may be measured and which is also capable of accurately indicating small changes in force throughout its entire range.

Another object of the invention is to provide force measuring apparatus for use in connection with equipment which depends for its operation upon the application and sudden release of forces of high magnitude.

A further object of the invention is the provision of force measuring apparatus by which forces of high magnitude may be accurately measured, and which is constructed to withstand the effect of the sudden release of such forces.

Another object of the invention is to provide force measuring apparatus having parts, whose range of relative movement is small upon the application of a force of relatively high magnitude, and in which means is provided by which such movement is greatly multiplied, whereby small variations in the applied force may be accurately measured.

A further object of the invention is the provision of force measuring apparatus which is electrically operated and in which the parts are enclosed to protect the same against injury.

Another object of the invention is to provide force measuring apparatus having parts arranged for relative movement upon the application of a pulling force thereto and in which hydraulically operable means is provided for multiplying the movement of the parts.

A further object of the invention is the provision of force measuring apparatus having parts which are arranged for relative longitudinal movement in one direction upon the application to the apparatus of a pulling force and in the other direction upon the release of such force, and including means for retarding the relative movement of the parts in said other direction upon the sudden release of said force.

A still further object of the invention is to provide force measuring apparatus of the kind mentioned which is of simple design and rugged construction, capable of withstanding the extreme conditions of hard usage and exposure to which apparatus of such character is likely to be subjected.

The above and other important objects and advantages of the invention may best be understood from the following detailed description, constituting a specification of the same, when considered in conjunction with the annexed drawings, wherein—

Figure 2 is a vertical, central cross-sectional view, on an enlarged scale, illustrating a preferred form of the invention;

Figure 3 is a cross-sectional view, taken along the line 3—3 of Figure 2, looking in the direction indicated by the arrows;

Figure 4 is a view similar to that of Figure 2, illustrating a modified form of the invention;

Figure 5 is a cross-sectional view, taken along the line 5—5 of Figure 4, looking in the direction indicated by the arrows;

Figure 6 is a cross-sectional view, taken along the line 6—6 of Figure 4, looking in the direction indicated by the arrows; and Figure 7 is a detail view on an enlarged scale showing the construction of the potentiometer of the form of the invention illustrated in Figure 4 and the mechanism by which the same is operated.

Figure 1:
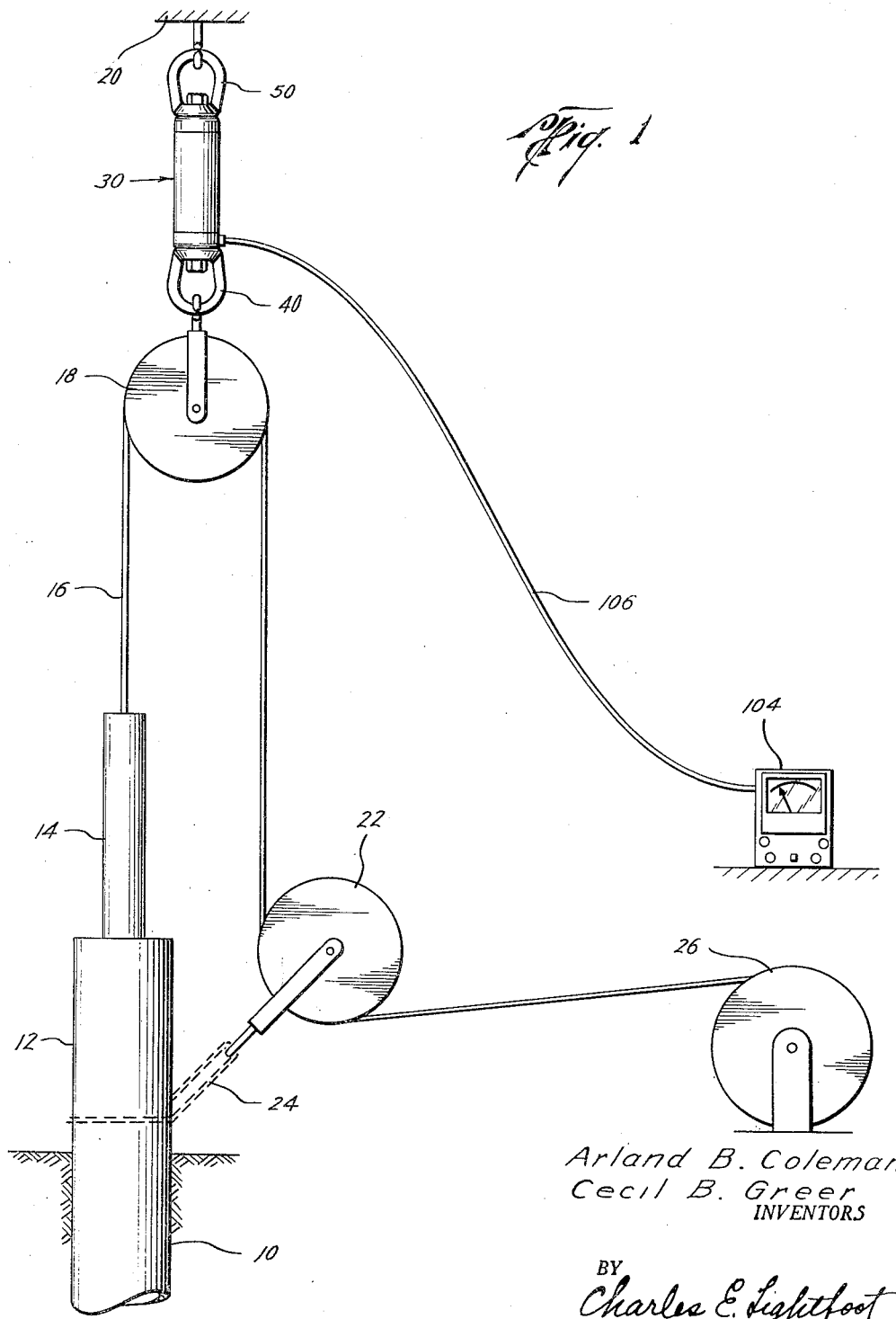
Figure 1 is an elevational view illustrating the application of the invention and showing the same applied to well equipment for measuring the pulling force exerted on such equipment.

The invention is illustrated herein, by way of example, in connection with its use in the measuring of pulling forces applied to well equipment of the type wherein a pulling force of accurately determined magnitude is applied to the equipment, it being understood that the invention is not to be limited to such use, but is capable of employment in numerous different types of apparatus wherein it may be desired to accurately indicate an applied force.

Referring now to the drawings in greater detail, the invention is illustrated in Figure 1 in its application to equipment which is operated in a well, indicated at 10, having the usual well casing 12, within which equipment of conventional type, indicated at 14, is to be operated. Such equipment may, for example, take the form of a grapple and jarring mechanism, which is connected to a wire line or cable 16, to be lowered into the well into engagement with a lost object for the purpose of recovering the same from the well.

In the present illustration the cable 16 passes upwardly and over a sheave 18, which is suitably anchored to a derrick or other supporting structure, indicated at 20, and the cable then passes downwardly and about a sheave 22 which is suitably anchored to the casing 10 or other structure, as by means of the chain 24. The cable is connected to any suitable winding mechanism, such as that indicated at 26, which is suitably anchored and which may be operated to wind up or pay out the cable to operate the well equipment.

The above described well equipment and operating mechanism is of conventional type, forming no part of the present invention.

The force measuring apparatus of the invention is generally indicated at 30, and may conveniently be applied to the above described equipment by interposing the same in the position shown in Figure 1, between the sheave 18 and the supporting structure 20, whereby the pull exerted on the cable 16 may be measured at all times during the operation of the equipment.

A preferred form of the force measuring apparatus of the invention is illustrated in Figures 2 and 3, wherein the apparatus has an outer tubular casing or barrel 32, which is externally threaded at its opposite ends for the attachment thereto of screw-caps 34 and 36. The cap 36 has an external, centrally disposed stud 38 for the attachment thereto of a swivel eye 40 which is retained on the stud by a nut 42.

Within the barrel 32 a plunger 44 is movably disposed, having a stem 46 which extends through an opening 48 in the cap 34. A swivel eye 50 is disposed on the stem 46 outwardly beyond the cap 34 and is retained thereon by a nut 52. Suitable packing, such as that indicated at 54, is provided between the cap 34 and stem 46 in a groove provided for that purpose, and similar packing 56 is disposed in an external groove in the plunger 44 forming a fluid tight seal between the plunger and the inside of the barrel. Packing means is also provided, as indicated at 60, between the cap 34 and the barrel in a groove provided for that purpose.

The plunger 44 has a longitudinal bore 62 therein which opens outwardly at one end of the plunger and which is in communication at its other end with a passageway 64 in the plunger and stem, which passageway leads to the exterior of the stem at a point within the barrel. A piston 66 is positioned in the barrel and has an extension 68 which is slidably fitted into the bore 62, the piston being engageable with the plunger when the extension reaches the limit of its movement into the bore. Suitable packing, such as that shown at 70 surrounds the extension 68, in a groove provided for that purpose, to form a fluid tight seal between the extension and the plunger.

It will be apparent that the space within the barrel and plunger between the packing 54 of the cap 34 and packing 70 of extension 68 forms a fluid chamber 72 which may be filled with a suitable liquid such as oil, an opening 74 being provided in the cap 34 through which the liquid may be supplied to the chamber, and which may be closed by a screw plug 76 or other convenient closure.

An elongated support member 78 is disposed in the barrel, carried by the cap 36 to which the member is attached by means of a screw 80, which passes through an opening in an external end flange 82 on the member and is threaded into the cap. The support member carries an elongated electrical resistance element 84 in position for contact with a movable sliding contact member, not shown, which is carried by a rod 86 whose upper end extends into and is secured to a tubular projection 88 on the piston 66, whereby the position of the contact member on the resistance element will be varied in accordance with the movement of the rod. This arrangement of the resistance element and movable contact constitutes a potentiometer of conventional design which is variable in accordance with the relative longitudinal movement of the barrel and plunger. A coil spring 90 surrounds the rod 86 and bears at one end against the piston 66 and at the other end against the element 84 to yieldingly urge the piston away from the element.

A coil spring 92 is also disposed in the barrel between the piston 66 and the external flange 82 to yieldingly urge the piston 66 toward the plunger 44.

The cap 36 has a passageway 94, which communicates with an opening 96 in the support member 78 and leads to the exterior of the cap, and through which conductors, such as those indicated at 98 and 100 may pass for connection to the resistance element 84. The passageway 94 is closed at its outer end by a connector plug 102, to which the conductors 98 and 100 are connected, and which is of a conventional type whereby the resistance element may be connected to an external source of current.

In making use of the above described apparatus the swivel eye 40 is connected to the sheave 18 and the swivel eye 50 is connected to the support 20, as illustrated in Figure 1. A weightometer 104, of conventional design, such as a milliammeter of convenient capacity with which a source of electric current such as a battery, not shown, is connected, is then connected to the conductors 98 and 100 through an electric cable 106 connected to the connector plug 102, whereby a current may be caused to flow through resistance element 84, which current will be varied in accordance with the amount of the resistance element which is in the circuit and will be indicated by the milliammeter.

Upon the exertion of a pull on the cable 16, the plunger 44 will move toward the cap 34 to exert a compressive force on the liquid in the chamber 72 which will be transmitted to the extension 68 of piston 66 to move the piston toward the cap 36. Due to the difference in the cross-sectional area of the chamber 72 above the plunger and the cross-sectional area of the extension 68, the piston 66 will be moved downwardly a greater distance than the upward movement of the plunger 44, thus moving the rod 86 downwardly to reduce the amount of the resistance element 84 in the circuit thereby increasing the flow of current. By suitably calibrating the weightometer 104, the amount of pull on the cable may thus be accurately indicated.

In the event that the pulling force on the cable should be suddenly released, as in the employment of jarring mechanism of the upward impact type, the spring 92 will operate to move the piston 66 upwardly into engagement with the plunger and the weightometer will immediately indicate that the pull has been released.

A somewhat modified form of the invention is illustrated in Figures 4 to 7, wherein the barrel 32' is closed at its lower end and is internally threaded at its upper end to receive a plug 108.

Within the barrel a plunger 110 is movably disposed, which has a stem 112 extending upwardly through an opening 114 in the plug 108. The plug is formed with internal longitudinal grooves 116 in the opening and the stem has radially extending projections 118 thereon which extend into the grooves 116 to prevent relative rotation of the barrel and stem.

Packing, such as that indicated at 54' is disposed about the stem in an internal groove in the plug 108 to form a fluid tight seal between the plug and stem, and similar packing 56' surrounds the plunger 110 in an external groove therein to form a fluid tight seal between the plunger and barrel. Packing, such as that indicated at 60' may also be disposed in an external groove in the plug to form a fluid tight seal between the plug and barrel.

The space within the barrel between the plug and piston forms a fluid chamber, and the plug is provided with suitable passageways 120 opening into the chamber and which lead to the exterior of the plug, and through which liquid may be supplied to the chamber. The passageways are closed by screw plugs 124 or other suitable closures.

Pressure fluid operable potentiometer mechanism indicated generally at 126 of the Bourdon tube type is provided within the barrel, carried by the plunger 110. This mechanism is enclosed within a suitable casing 128, attached to the plunger by a tubular fitting 130. Within the casing 128 a curved tube 132 is supported at one end by a tubular connector 134, which is threaded into the fitting 130, the other end of the tube being closed.

The stem 112 has a passageway 136 which is in communication with the chamber 72' and with a passageway 138 in the plunger 110 which leads to the interior of the tube 132 through the fitting 130 and connector 134.

The closed end of the tube 132 carries a curved extension 140 which is connected at its outer end to a pivotally supported contact member 142 positioned for sliding contact with a curved resistance element 144 anchored to the casing.

The resistance element 144 and contact member 142 are connected by flexible conductors 146 and 148 to a connector plug 102' by which the potentiometer may be connected to the weightometer 104 by the electric cable 106 to operate the weightometer in a manner similar to that previously described in connection with the form of the invention illustrated in Figures 2 and 3.

In making use of this modified form of the invention the swivel eyes 40' and 50' are connected to the sheave 18 and support 20 in the manner previously described and upon the exertion of a pull on the cable the plunger 110 will be moved toward the plug 108, whereupon a compressive force will be exerted on the liquid in chamber 72' to force the liquid through passageways 136 and 138 into the tube 132. The pressure of the liquid in the tube 132 will cause the tube to move from the position shown in solid lines to the position shown in dotted lines in Figure 7 and the contact member 142 will describe a corresponding movement about the pivot 143 to vary the amount of the resistance element 144 in the circuit.

Upon the occurence of a decrease in the force exerted on the cable 16, the tube 132 will tend to contract, moving the contact member 142 in a direction to increase the amount of resistance in the weightometer circuit and return liquid to the chamber 72'.

It will be apparent that, due to the relatively great difference between the cross-sectional area of the chamber 72' and that of the tube 132, a small relative movement between the barrel and plunger will result in a large movement of the contact member 142, so that a small change in the pull exerted on the cable may be indicated by the weightometer.

It will thus be seen that the invention provides force indicating apparatus which is constructed to carry heavy loads and which at the same time is capable of accurately indicating small variations in an applied force of high magnitude.

While the invention has been disclosed herein in connection with certain specific embodiments of the same, it will be understood that these are intended by way of illustration only, and that various changes can be made in the construction and arrangement of the parts without departing from the spirit of the invention or the scope of the appended claims.

Having thus clearly shown and described the invention, what is claimed as new and desired to secure by Letters Patent is:

1. Force measuring apparatus adapted to form a connection between two objects to transmit force from one to the other of the objects, comprising a tubular barrel, a plunger movably disposed in the barrel, a stem on the plunger, closure means on one end of the barrel and having an opening therethrough through which the stem is slideably extended, means for connecting the barrel to one of said objects, means for connecting said stem to the other of said objects, a fluid chamber formed in the barrel between said plunger and closure means, said plunger having a longitudinal bore and a passageway in communication with said chamber and bore, sealing means between the plunger and barrel and between the stem and closure means, a piston movably disposed in the bore, sealing means between said piston and plunger in said bore, said piston being movable longitudinally in one direction in said bore under the influence of the pressure of fluid in said chamber upon longitudinal movement of the plunger in the other direction relative to the barrel, and means for indicating the amount of said longitudinal movement of said piston.

2. Force measuring apparatus adapted to form a connection between two objects to transmit force from one to the other of the objects, comprising a tubular barrel, a plunger movably disposed in the barrel, a stem on the plunger, closure means on one end of the barrel and having an opening therethrough through which the stem is slidably extended, means for connecting the barrel to one of said objects, means for connecting the stem to the other of said objects, a fluid chamber formed in the barrel between said plunger and closure means, said plunger having a passageway therethrough in communication with said chamber and opening into the barrel exteriorly of the chamber, sealing means between the plunger and barrel and between the stem and closure means, an electrical circuit, variable electrical resistance means in said circuit and including means in the barrel connected in communication with said passage and operable in response to a change in the pressure of fluid in said chamber to vary the resistance of said circuit.

3. Force measuring apparatus adapted to form a connection between two objects to transmit force from one to the other of the objects, comprising a tubular barrel, a plunger movably disposed in the barrel, a stem on the plunger, closure means on one end of the barrel and having an opening therethrough through which the stem is slidably extended, means for connecting the barrel to one of the objects, means for connecting the stem to the other of said objects, a fluid chamber formed in the barrel between said plunger and closure means, said plunger having a passageway therethrough in comunication with said chamber and opening into the barrel exteriorly of the chamber, sealing means between the plunger and barrel and between the stem and closure means, an electrical circuit, and means in said circuit for varying the resistance of the circuit in response to relative longitudinal movement of said barrel and plunger and including a resistance element in the barrel, contact means movably mounted in the barrel and positioned in sliding contact with said element, and pressure fluid operable means in the barrel connected in communication with said passageway and having an operating connection with said contact to vary the position of said contact means in contact with said element in response to a change in the pressure of fluid in said chamber.

4. Force measuring apparatus adapted to form a connection between two objects to transmit force from one to the other of the objects, comprising a tubular barrel, a plunger movably disposed in the barrel, a stem on the plunger, closure means on one end of the barrel and having an opening through which the stem is slidably extended, means for connecting the barrel to one of the objects, means for connecting the stem to the other of the objects, a fluid chamber formed in the barrel between the plunger and said closure means, sealing means between the plunger and barrel and between the stem and closure means, said plunger having a longitudinal bore opening at one end exteriorly of the chamber and a passageway in communication with the chamber and leading into said bore, a piston movably disposed in the bore, yieldable means in the barrel positioned to coact with the barrel and piston to yieldingly urge the piston inwardly of the bore, said piston being movable outwardly of the bore upon relative longitudinal movement of the barrel and plunger in a direction to increase the pressure of fluid in said chamber, and means for measuring the movement of said piston and barrel.

References Cited in the file of this patent

UNITED STATES PATENTS

| | | |
|---|---|---|
| 1,214,745 | Beard | Feb. 6, 1917 |
| 2,466,071 | Barnes | Apr. 5, 1949 |
| 2,641,926 | Eisenbart | June 16, 1953 |
| 2,669,876 | Lentz | Feb. 23, 1954 |

FOREIGN PATENTS

| | | |
|---|---|---|
| 458,245 | Italy | July 4, 1950 |